United States Patent
Yao et al.

(10) Patent No.: US 8,086,839 B2
(45) Date of Patent: Dec. 27, 2011

(54) AUTHENTICATION FOR RESUME BOOT PATH

(75) Inventors: Jiewen Yao, Shanghai (CN); Ned McArthur Smith, Beaverton, OR (US); Vincent J. Zimmer, Federal Way, WA (US); Qin Long, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 442 days.

(21) Appl. No.: 12/346,532

(22) Filed: Dec. 30, 2008

(65) Prior Publication Data
US 2010/0169631 A1 Jul. 1, 2010

(51) Int. Cl.
*G06F 9/00* (2006.01)
*G06F 21/00* (2006.01)
*G06F 1/26* (2006.01)
*H04L 9/32* (2006.01)

(52) U.S. Cl. .............. 713/2; 713/1; 713/168; 713/182; 713/320

(58) Field of Classification Search .......... 713/1, 2, 713/168, 182, 320
See application file for complete search history.

(56) References Cited

U.S. PATENT DOCUMENTS

| | | | |
|---|---|---|---|
| 7,000,249 B2* | 2/2006 | Lee | 726/20 |
| 7,103,529 B2 | 9/2006 | Zimmer et al. | |
| 7,174,463 B2* | 2/2007 | Cromer et al. | 713/186 |
| 7,284,136 B2 | 10/2007 | Zimmer et al. | |
| 7,412,596 B2* | 8/2008 | Challener et al. | 713/2 |
| 2008/0083019 A1* | 4/2008 | Wang et al. | 726/5 |
| 2008/0222423 A1* | 9/2008 | Rodriguez et al. | 713/182 |

OTHER PUBLICATIONS

Hewlett-Packard Corp., et al., "Advanced Configuration and Power Interface Specification", Revision 3.0b, Oct. 10, 2006.
Yao, Jiewen, et al., "Method for Firmware Isolation", U.S. Appl. No. 11/897,355, filed Aug. 30, 2007.

* cited by examiner

*Primary Examiner* — Stefan Stoynov
(74) *Attorney, Agent, or Firm* — Blakely, Sokoloff, Taylor & Zafman LLP (57) ABSTRACT

Methods and systems to perform an authentication operation after resuming from a sleep state are presented. In one embodiment, a method includes starting a boot process from a sleep state. The method further includes providing platform services to support an authentication operation as part of the boot process and determining whether to complete the boot process based at least on results of the authentication operation.

18 Claims, 8 Drawing Sheets

AUTHENTICATION FOR RESUME BOOT PATH

FIELD OF THE INVENTION

Embodiments of the invention relate to a boot process of computer systems; more particularly, embodiments of the invention relate to resuming from a sleep state.

BACKGROUND OF THE INVENTION

During a normal boot process, such as, a boot process from mechanical power on (S5 state), unified extensible firmware interface (UEFI) is made available to third party vendors. In the driver execution environment (DXE) phase during a normal boot process, DXE drivers from various vendors collectively build a preboot environment for a computer system.

When resuming from a sleep state, a computer system restores the preboot environment. An S3 state (also known as suspend to RAM) is a sleep state corresponds to a standby mode in operating systems such as, for example, Windows XP and some variants of Linux-based operating systems. In the S3 state, main memory (RAM) is still powered. The contents of main memory when a computer system awake from the S3 state is the same as when the computer system was put into the S3 state. Since states of an operating system, all applications, opened documents, etc. are stored in main memory, users can resume work from where they left off.

Figure 1:
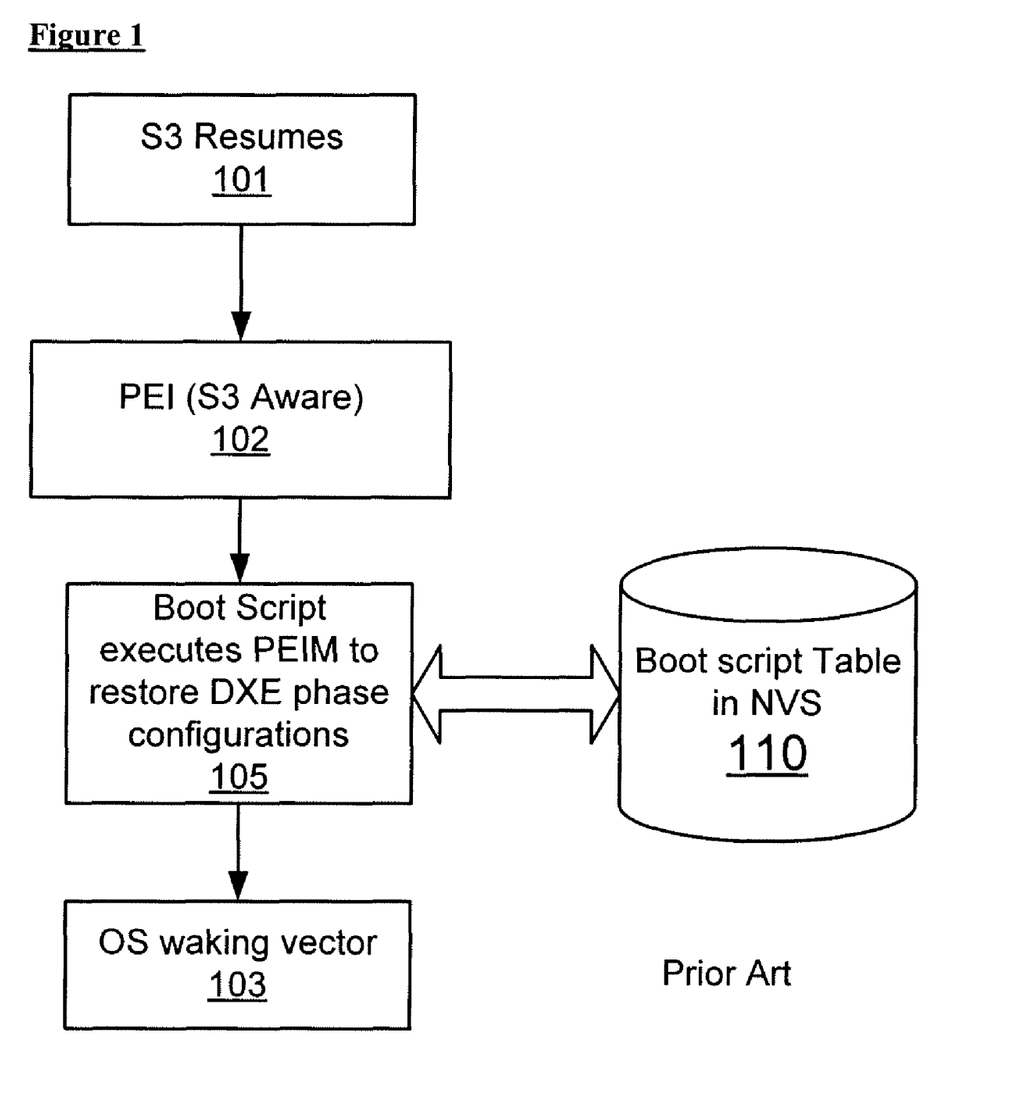
FIG. 1 is a flow diagram showing the S3 resume boot path.

FIG. 1 shows an example of the S3 resume boot path. Referring to FIG. 1, BIOS (Basic Input/Output system) restores chipset and processor configurations in the PEI phase (process block 101-102). Typically, operations for restoring to a preboot state are saved as a boot script in non-volatile storage during a previous S5 normal boot (process blocks 103, 110). By executing the boot script, the DXE phase is bypassed in the S3 resume boot path.

UEFI interfaces, especially with respect to the DXE phase, are not exposed to third parties in the S3 resume boot path. The DXE phase is not available in the S3 resume boot path because of the following reasons: (1) the DXE phase hosts numerous services, which makes the firmware modules rather large; and (2) loading DXE from a flash memory is very time consuming and complicated.

Often BIOS replays the authentication information collected during S5 normal boot. A laptop, stolen while in the S3 state, might be used without any authentication by whoever obtained the laptop. The system is therefore compromised and becomes vulnerable to a security attack.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only

DETAILED DESCRIPTION OF THE INVENTION

Methods and systems to perform an authentication operation after resuming from a sleep state are presented. In one embodiment, a method includes starting a boot process from a sleep state. The method further includes providing platform services to support an authentication operation as part of the boot process and determining whether to complete the boot process based at least on results of the authentication operation.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

Figure 2:
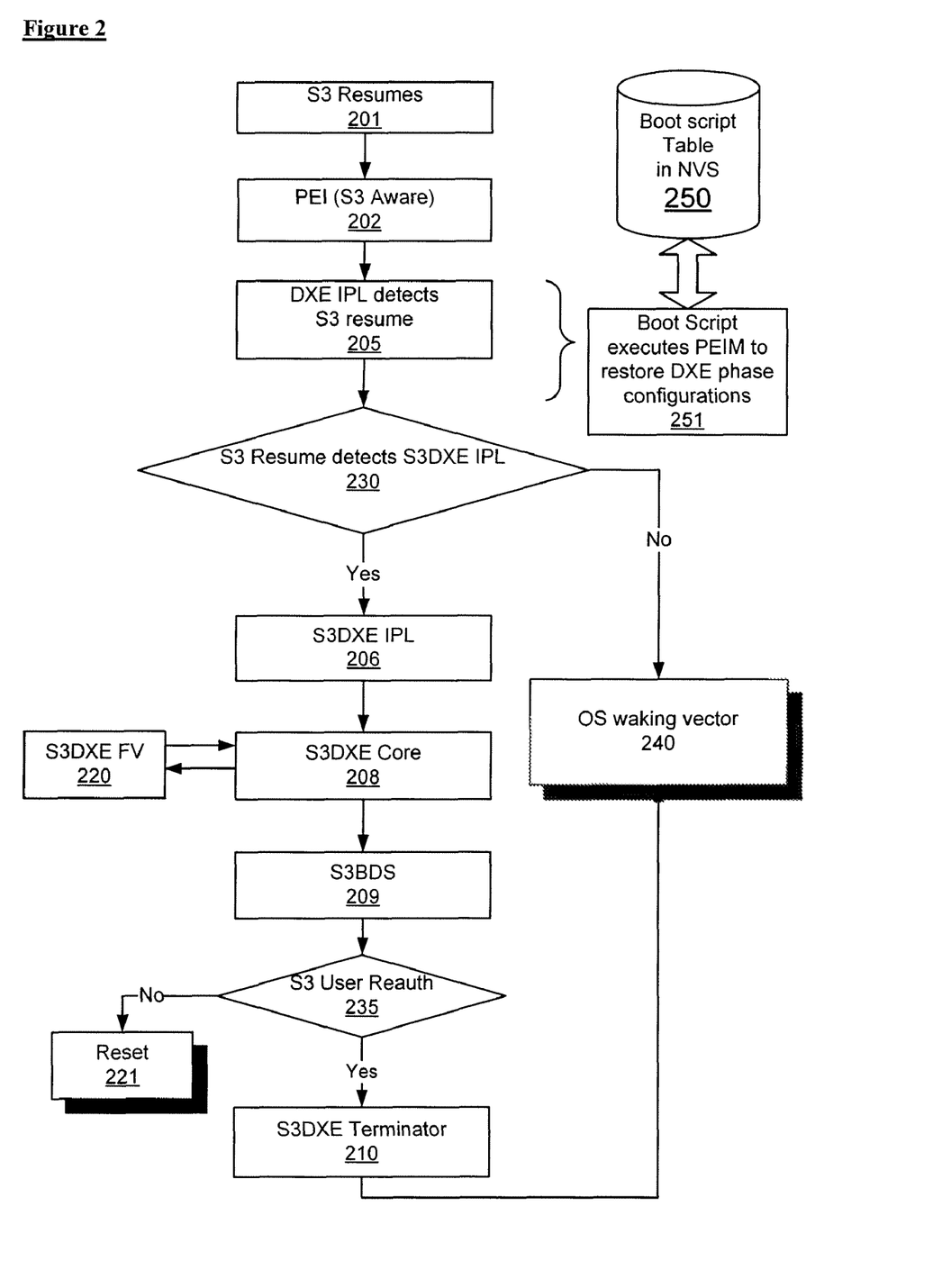
FIG. 2 is a flow diagram of an embodiment of a process to provide S3DXE interfaces.

FIG. 2 is a flow diagram of an embodiment of a process to provide S3DXE interfaces. The process is performed by processing logic that may comprise hardware (circuitry, dedicated logic, etc.), software (such as one that is run on a general purpose computer system or a dedicated machine), or a combination of both. In one embodiment, the process is performed by a computer system with respect to FIG. 7.

In one embodiment, a computer system supports different boot paths including a normal boot and awakening from a sleep state (e.g., S3 state), in accordance with Advanced Configuration and Power Interface (ACPI) specification (see, Advanced Configuration and Power Interface Specification, revision 3.0b, Oct. 10, 2006). In one embodiment, S3DXE interfaces are exposed to third party modules including preboot authentication modules (PBAM) during the S3 resume boot process. Referring to FIG. 2, in one embodiment, the process begins by processing logic detects that a computer system is waking from a sleep state (e.g., S3 state) (process block 201). Processing logic determines a boot path and starts a platform environment initialization (PEI) phase by executing PEI modules (PEIM) (process block 202). In one embodiment, each PEIM is boot path aware such that the PEIM calls a PEI service to determine what the current boot path is.

In one embodiment, processing logic launches DXE initial program load (DXE IPL). In one embodiment, DXE IPL is a PEIM to PEIM interface (PPI) and is the last PPI that is executed in the PEI phase. In one embodiment, processing logic, in response to DXE IPL, determines that a boot path is a S3 resume boot path (process block 205). In one embodiment, processing logic loads an S3 resume module (e.g., S3Resume PEIM) if the boot path is a S3 resume boot path.

In one embodiment, processing logic saves a configuration during a normal boot path and uses the same configuration during a S3 resume boot process. In one embodiment, system configurations and operations to restore a preboot state are saved as a boot script in non-volatile storage drive 250. In one embodiment, processing logic loads the boot script to restore DXE phase configurations previously saved (process block 251). In one embodiment, a PEIM executes the boot script is referred to herein as boot script executor.

In one embodiment, processing logic determines whether S3DXE IPL exists (process block 230). If S3DXE IPL does not exist, processing logic continues the execution by referring to an operating system waking vector (process block 240). Otherwise, If S3DXE IPL exists, processing logic loads and executes S3DXE IPL (process block 206).

In one embodiment, in response to S3DXE IPL, processing logic loads S3DXE Core (process block 208).

In one embodiment, S3DXE contains information about locations of S3DXE firmware volumes (S3DXE FV). In one embodiment, processing logic loads and dispatches one or more S3DXE firmware volumes (S3DXE FV) (process block 220). In one embodiment, firmware volumes are stored as files in a flash memory or a partition of a storage drive. In one embodiment, the storage drive is encrypted by a processor or platform firmware.

In one embodiment, by loading S3DXE Core and S3DXE FV, a system provides part of services or interfaces as by loading DXE Core and DXE firmware volumes during a normal boot path. In one embodiment, S3DXE Core is customized from DXE Core.

In one embodiment, processing logic proceeds to the S3BDS phase (process block 209). In one embodiment, the S3BDS phase begins in response to execution of S3DXE Core. In one embodiment, additional third party drivers are loaded during S3BDS phase. In one embodiment, S3DXE modules expose UEFI/DXE interfaces during the S3BDS phase. Third party programs use platform services made available via the UEFI/DXE interfaces.

In one embodiment, a third party code written and compiled for execution in the DXE phase in a normal boot path is also executable in conjunction with the S3DXE phase. In one embodiment, platform services include a universal serial bus I/O (USB IO) service. In one embodiment, the USB 10 service is compatible with 64 bits address management which supports a larger memory space compared to legacy modes.

In one embodiment, processing logic performs user authentication process to verify whether a user is authenticated for accessing a computer system (process block 235). In one embodiment, users are required to provide a password via I/O devices (e.g., a keyboard, a numerical pad, input buttons, etc.). In one embodiment, processing logic authenticates a user by using a digital signature. In one embodiment, biometric information (e.g., finger prints), voice recognition, smart card, other any combinations thereof is used as a technique for user authentication.

In one embodiment, user authentication modules include but not limited to a preboot authentication module (PBAM). In one embodiment, PBAM is a third party code which is also loaded for user authentication during preboot phases of a normal boot path. In one embodiment, authentication during a S3 resume boot process is referred to herein as S3 re-authentication.

In one embodiment, if S3 re-authentication fails, processing logic resets the system (process block 221). In one embodiment, users are allowed to make a few attempts before processing logic resets the system. In one embodiment, processing logic shuts down the system and prevents further access until a system administrator or a person with a supervisory password restarts the system.

In one embodiment, if S3 re-authentication passes, S3BDS loads S3DXE Terminator (process block 210). In one embodiment, processing logic, in response to execution of S3DXE Terminator, erases the memory storing S3DXE Core and S3DXE FV so that the contents will not be accessible after operating system is booted successfully. In one embodiment, processing logic returns the control to the PEI phase. In one embodiment, processing logic, in response to S3DXE terminator, returns the control to S3DXE IPL.

In one embodiment, processing logic continue the execution by referring to an operating system waking vector (process block 240). In one embodiment, S3Resume PEIM determines the location as indicated by an OS waking vector. In one embodiment, S3DXE terminator does not proceed to the OS waking vector directly because operating systems do not provide interfaces to take over execution from S3BDS phase of the S3 resume boot path.

In one embodiment, firmware modules (e.g., S3DXE IPL, S3DXE Core, and S3DXE FV) are stored in a system memory (i.e., dynamic random access memory), a flash memory, a system management random access memory (SMRAM), a partition of a storage drive, or any combinations thereof. In one embodiment, the storage drive is encrypted by a processor or platform firmware. In one embodiment, locations of the firmware modules are indicated in a boot script table.

In one embodiment, S3DXE interfaces are exposed and user authentication is performed in conjunction with the interfaces. Independent software vendors are able to program in conjunction with the interfaces to make their solutions compatible with different computer systems. Previously, no standard interface is available in legacy BIOS and UEFI BIOS. Legacy BIOS uses interfaces such as, INT10 for video or INT16 for keyboard, which have limited memory space because of a 16 bits addressing mode. Also, third party vendors were not able to use a same binary for different platforms during a S3 resume boot process because there was no standard UEFI interfaces exposed.

In one embodiment, a storage encryption technology in conjunction with S3DXE interfaces protect encrypted storage drives by performing user authentication before accessing the storage drives is allowed. In one embodiment, user authentication unlocks the access to storage drives via Advanced Host Controller Interface (AHCI).

In one embodiment, re-authentication during the S3 resume boot process is used for mobile devices which users do not often reboot or restart.

Figure 3:
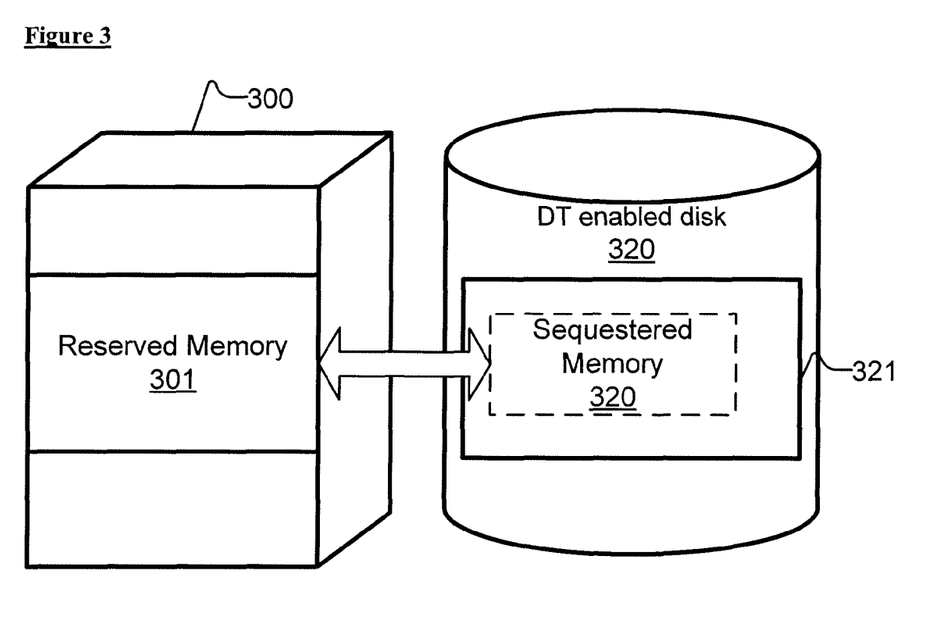
FIG. 3 shows an embodiment of computer storages for storing S3DXE firmware volumes.

FIG. 3 shows an embodiment of computer memories for storing S3DXE firmware volumes. Referring to FIG. 3, in one embodiment, computer memories include system memory 300 and storage drive 320. In one embodiment, system memory includes reserved memory portion 301. In one embodiment, storage drive 320 includes hidden partition 321, which in turns includes sequestered memory portion 320.

In one embodiment, storage drive 320 is an encrypted hard drive. In one embodiment, the encryption is performed and managed by platform firmware. In one embodiment, storage drive 320 is encrypted in accordance with Intel® encryption technology (e.g., Danburry technology).

In one embodiment, sequestered memory portion 320 is reserved for storing S3 firmware modules (e.g., S3DXE core, S3DXE FV) used in the S3 resume boot path. In one embodiment, during a normal boot path, S3 firmware modules are created in system memory 300 and saved to sequestered memory 320, such that system memory 300 is released to operation system during run time.

In one embodiment, the capacity of storage drive 320 is larger than system memory 300. In one embodiment, system memory 300 is a more expensive computer resource compared to storage drive 320. Users are more likely to notice a reduction of the size of system memory 300 than a reduction of the capacity of storage drive 320. In one embodiment, if the size of reserved memory portion 301 is increased, the operating system will have less system resource to use during runtime, hence causing the system performance to deteriorate.

In one embodiment, during the S3 resume boot process, S3Resume PEIM loads S3 firmware modules from sequestered memory portion 320. In one embodiment, S3DXE IPL swaps contents of sequestered memory portion 320 with contents of reserve memory portion 301. In one embodiment, contents of reserved memory portion 301 are part of a memory image saved when a system is put into a sleep mode.

In one embodiment, the S3 firmware modules are executed in reserved memory portion 301. In one embodiment, after S3 re-authentication is completed, S3DXE Terminator terminates S3DXE interfaces and returns the control to a PEI phase (e.g., S3DXE IPL).

In one embodiment, S3DXE IPL swaps contents of sequestered memory portion 320 with contents of reserve memory portion 301 again. Now, the memory image is restored to where it is from originally, and S3 firmware modules are also restored to sequestered memory portion 320.

In one embodiment, S3DXE IPL reads from and writes to hidden partition 321 via Host Embedded Controller Interface (HECI) commands. In one embodiment, hidden partition 321 also stores other meta-data for encryption of storage drive 320.

In one embodiment, reserved memory portion 301 is made available to other programs after S3DXE terminator swaps S3 firmware modules out from reserved memory portion 301. This reduces the overall size of reserved memory portion 301.

Figure 4:
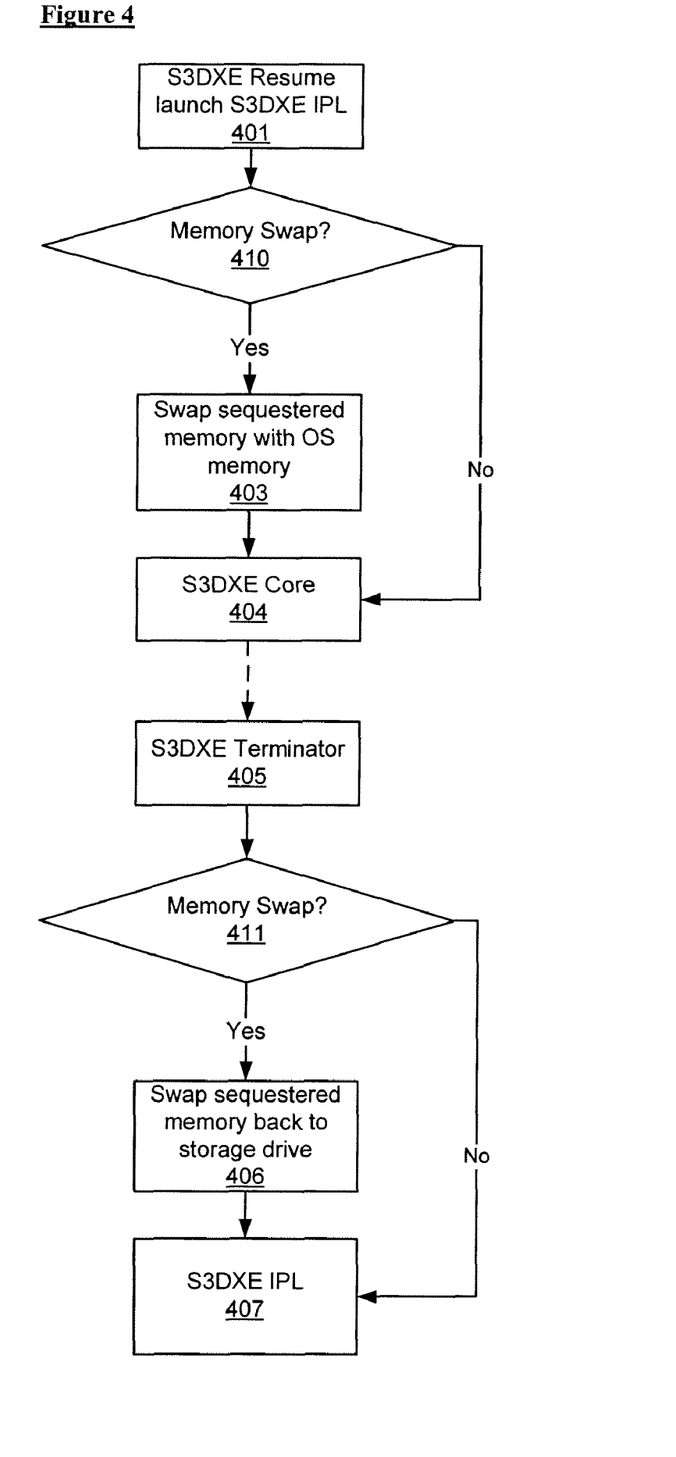
FIG. 4 is a flow diagram of an embodiment of a process for sequestering memory to support the S3 resume boot path.

FIG. 4 is a flow diagram of an embodiment of a process for sequestering memory to support the S3 resume boot path. The process is performed by processing logic that may comprise hardware (circuitry, dedicated logic, etc.), software (such as one that is run on a general purpose computer system or a dedicated machine), or a combination of both. In one embodiment, the process is performed by a computer system with respect to FIG. 7.

In one embodiment, the process begins by processing logic launches a S3DXE IPL module (process block 401).

In one embodiment, system memory (e.g., DRAM) includes a reserved memory portion that stores part of a memory image saved when a system goes into a sleep mode. In one embodiment, a storage drive includes a hidden partition, which in turn includes a sequestered memory portion to store S3 firmware modules (e.g., S3DXE core, S3DXE FV). In one embodiment, the storage drive is encrypted in accordance with Intel® encryption technology (e.g., Danburry technology).

In one embodiment, processing logic determines whether to perform a memory swap between the reserved memory portion and the sequestered memory portion (process block 410). In one embodiment, S3DXE IPL contains information of whether to perform a memory swap.

In one embodiment, if a memory swap is not required, processing logic proceeds to executing S3DXE Core (process block 404).

In one embodiment, processing logic swaps contents of the sequestered memory portion with contents of the reserved memory portion if a memory swap is required (process block 403).

In one embodiment, processing logic executes S3 firmware modules in the reserved memory portion. In one embodiment, processing logic loads and executes S3DXE Core (process block 404). Processing logic loads S3DXE firmware volumes in response to executing S3DXE Core. In one embodiment, processing logic proceeds with the S3BDS phase in which a user authentication operation is performed.

In one embodiment, after the authentication operation is completed, processing core terminates S3DXE interfaces (process block 405).

In one embodiment, processing logic determines whether to perform a memory swap (process block 411).

In one embodiment, processing logic returns the execution control to a PEI phase (e.g., S3DXE IPL) (process block 407) if a memory swap is not required. In one embodiment, processing logic swaps contents of the sequestered memory portion with contents of the reserve memory portion again such that the contents are restored to where they are from originally (process block 406).

In one embodiment, processing logic communicates to a storage drive and to manageability engine (ME) via a Host Embedded Controller Interface (HECI) bus. In one embodiment, HECI is a bi-directional, variable data rates bus that enables communication of system management information and events in a standard manner. In one embodiment, HECI replaces the use of System Management Bus (SMBus).

Figure 5:
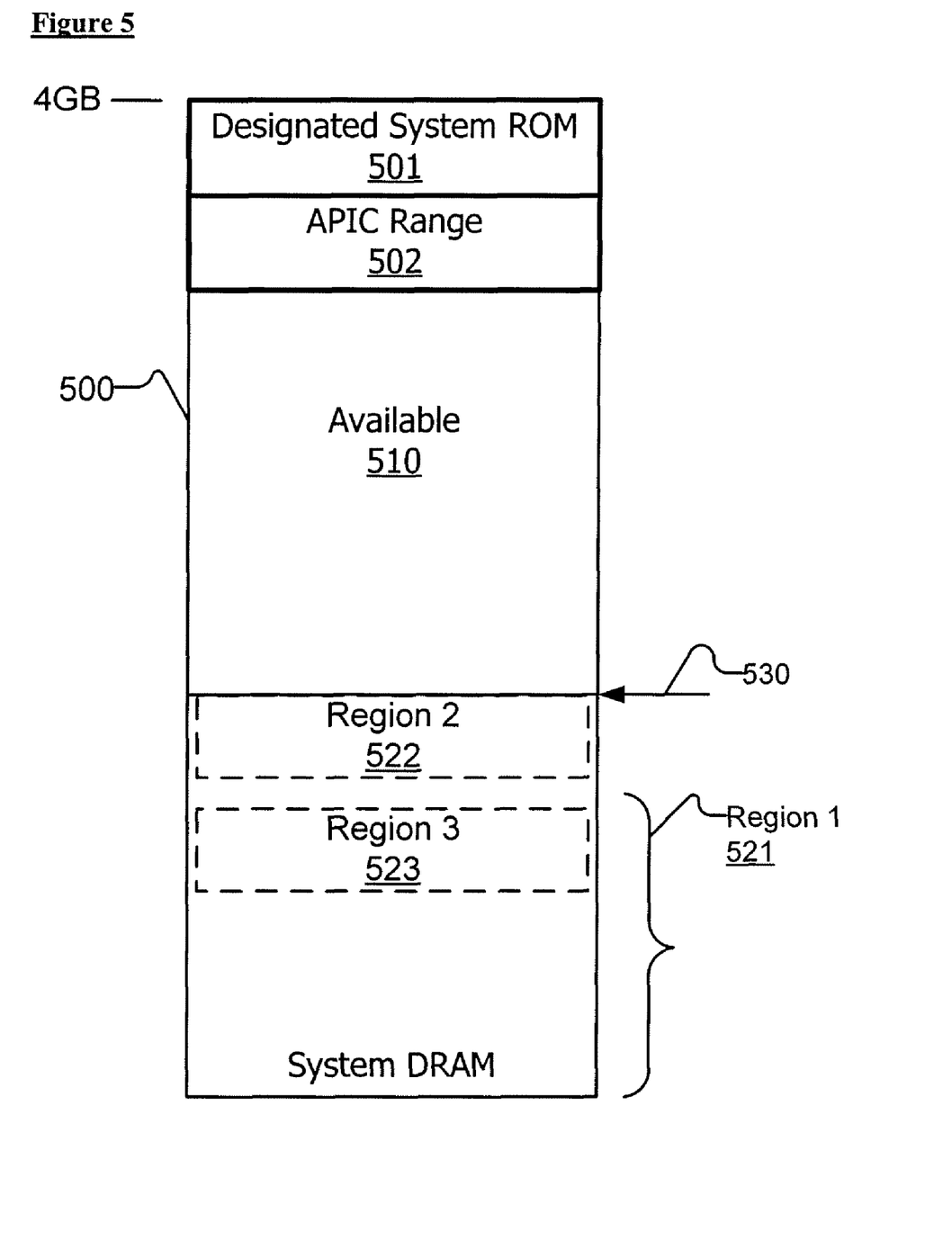
FIG. 5 is a memory map showing memory protection regions in accordance with an embodiment of the invention.

FIG. 5 is a memory map showing memory protection regions in accordance with an embodiment of the invention. Referring to FIG. 5, in one embodiment, memory map 500 includes system ROM region 501, APIC range 502, memory region 521, memory region 522, memory region 523, and other memory space 510 available for memory mapped input output system. In one embodiment, top of low usable DRAM (TOLUD) memory location is indicated as 530.

In one embodiment, memory region 501 below 4 Gbytes is mapped to a system read only memory (system ROM), a flash device, or other non-volatile memory to store firmware modules used for a boot process. In one embodiment, the memory region is a 16 Mbytes region at the top of 32-bit memory space (i.e., 4 Gbyte). In one embodiment, the very top of memory space (memory address—10h) contains a reset vector (e.g., Intel® Architecture 32-bit reset vector) for legacy compatibility.

In one embodiment, memory region 521 is a memory region created in a normal boot path (e.g., from S5). In one embodiment, memory region 521 is expected to be preserved and is usable during the S3 resume boot process.

In one embodiment, memory region 522 is a memory region reserved (sequestered) by the UEFI firmware. In one embodiment, memory region 522 is memory space for UEFI firmware execution during the S3 resume boot process. In one embodiment, memory region 522 is part of ACPI non-volatile sleeping (ACPI NVS) memory and is available to UEFI execution in a normal boot path. In one embodiment, memory region 522 is below TOLUD 530.

In one embodiment, region 523 is a subset of memory region 521. In one embodiment, memory region 523 is swapped to a partition of a storage disk so that more memory space (in additional to memory region 522) is available for executing and loading S3 firmware modules. In one embodiment, the partition is a hidden partition of a storage drive with Danbury encryption technology.

In one embodiment, to preserve system integrity, S3DXE IPL is capable to verify the integrity of memory region 522. In one embodiment, the SEC phase includes pre-verifier logic to authenticate the contents in memory region 522.

In one embodiment, memory region 521 stores part of a memory image saved when a system goes into a sleep mode. In one embodiment, memory region 521 is protected from unauthorized firmware modules (e.g., a fraudulent preboot authentication module) executing in memory region 522 or memory region 523. In one embodiment, the protection is performed by using a DXE Isolation method or by applying memory isolation in Intel® virtualization technology. The techniques will be described in further detail below with additional references to the remaining figures.

Figure 6:
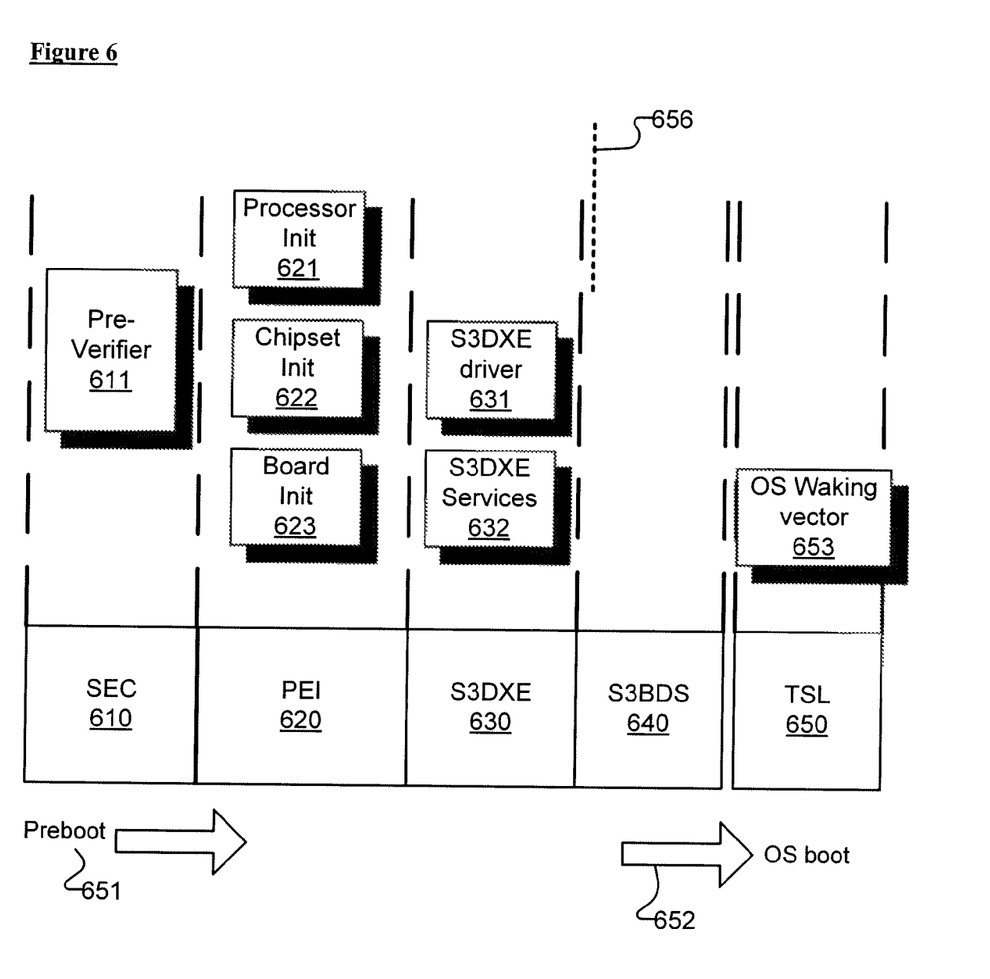
FIG. 6 is a block diagram showing memory protection during the S3 resume boot process in accordance with an embodiment of the invention.

FIG. 6 is a block diagram showing memory protection during the S3 resume boot process in accordance with an embodiment of the invention.

Referring to FIG. 6, a preboot process includes security (SEC) phase 610, pre-EFI initialization (PEI) phase 620, S3 driver execution environment (S3DXE) phase 630, S3 boot device selection (S3BDS) phase 640, and transient system load (TSL) phase 650. Other phases following the preboot process include an operating system run-time (RT) phase, and an after-life (AL) phase. The phases build upon one another to provide a runtime environment for the operating system (OS) and the platform.

In one embodiment, preboot 651 includes SEC phase 610, PEI phase 620, S3DXE phase 630, and S3BDS 640 phase. In one embodiment, OS runtime 652 begins after S3BDS phase 640.

In one embodiment, SEC phase 610 includes pre-verifier logic to authenticate contents in different memory regions (e.g., memory region 522 and memory region 523 in FIG. 5). In one embodiment, SEC phase 610 also supports security checks of the initial op-code to be executed on a computer system. SEC phase 610 includes a power-on sequence of a computer system and authenticates the PEI Foundation before the PEI Foundation is allowed to execute during the next phase.

In one embodiment, PEI phase 620 provides a standardized method of loading and invoking initial (INIT) configuration routines for a processor, a chipset, and a motherboard (processor INIT 621, chipset INIT 622, and board INIT 623). PEI phase 620 is responsible for initializing enough of the system to provide a stable base for the follow on phases. Initialization of the platform's core components, including the processor, the chipset, and the motherboard is performed during PEI phase 620.

In one embodiment, at the beginning of PEI phase 620, the system memory is not yet initialized. Once system memory is initialized during PEI phase 620, firmware modules are loaded into system memory for execution. The PEI logic may also ascertain the boot mode of a computer system. Embodiments of a boot mode include a normal boot, awakening from a sleep state (e.g., S3 state), and Recovery mode for reconstituting corrupted firmware.

In one embodiment, PEI phase 620 loads a S3 resume driver (S3Resume PEIM) and subsequently S3DXE IPL if a computer system is performing the S3 resume boot path.

In one embodiment, S3DXE phase 630 is the phase during which most of the system initialization is performed. S3DXE phase 630 is facilitated by several components, including S3DXE Core, S3DXE Dispatcher, and a set of S3DXE drivers 631. The S3DXE Core produces a set of boot time services, runtime services, and S3DXE services 632. S3DXE dispatcher is responsible for discovering and executing S3DXE drivers 631 in a correct order.

In one embodiment, S3DXE drivers 631 are responsible for initializing platform components as well as providing a software abstraction of the platform. These components work together to initialize the platform and to provide services that are required to perform operations such as, for example, a user authentication operation.

In one embodiment, after S3DXE drivers are loaded, S3DXE interfaces 656 are exposed to third party programs. In one embodiment, independent software vendors develop preboot authentication modules (PBAM) in conjunction with S3DXE interface 656.

In one embodiment, S3DXE Terminator erases the memory storing S3DXE Core and S3DXE FV so that the contents will not be accessible after operating system is booted successfully.

In one embodiment, processing logic returns the control to PEI phase 620 after S3DXE Terminator completes. In one embodiment, processing logic continues the execution by referring to an operating system waking vector.

The concept of allowing contributions of drivers and applications from multiple parties raises several concerns. The security of system firmware, provided by a single vendor, is implicit from the vendor. The incorporation of code modules from various sources might imperil system integrity. In one embodiment, when a system is put to a sleep state, host memory is preserved and saved as a memory image. In one embodiment, the memory image is protected from corruption or unauthorized accesses by third party modules during the S3 resume boot process. In one embodiment, the protection is performed by using a DXE Isolation method or by applying memory isolation in Intel® virtualization technology.

In one embodiment, DXE isolation is a firmware based isolation kernel used to protect the host memory during the S3 resume boot process. In one embodiment, S3DXE IPL loads DXE isolation drivers during S3DXE phase 630. In one embodiment, a DXE isolation driver is stored in one of the S3DXE firmware volumes.

In one embodiment, when performing DXE isolation, a virtual translation look-aside buffer (TLB) is used to manage access state of memory pages. The TLB is referred to determine whether a memory page is read protected, write-protected, authorized for update, authorized for read/write, or authorized for read only. It will be appreciated by those skilled in the art that different protection levels on a memory page can be used.

In one embodiment, S3DXE IPL unloads DXE isolation drivers, prior to passing control to an operating system waking vector. In one embodiment, DXE isolation is unloaded by OS waking vector 653 in transient system load phase 650.

In one embodiment, memory isolation techniques used in virtualization such as, hypervisor (HV) and virtual machine monitor (VMM) are used to protect the host memory image from unauthorized accesses. In one embodiment, a VMM provides pre-boot security by sandboxing programs developed by third parties. Running a program in sandbox mode prevents the program from having access to the rest of a computer system, including the host memory image.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Figure 7:
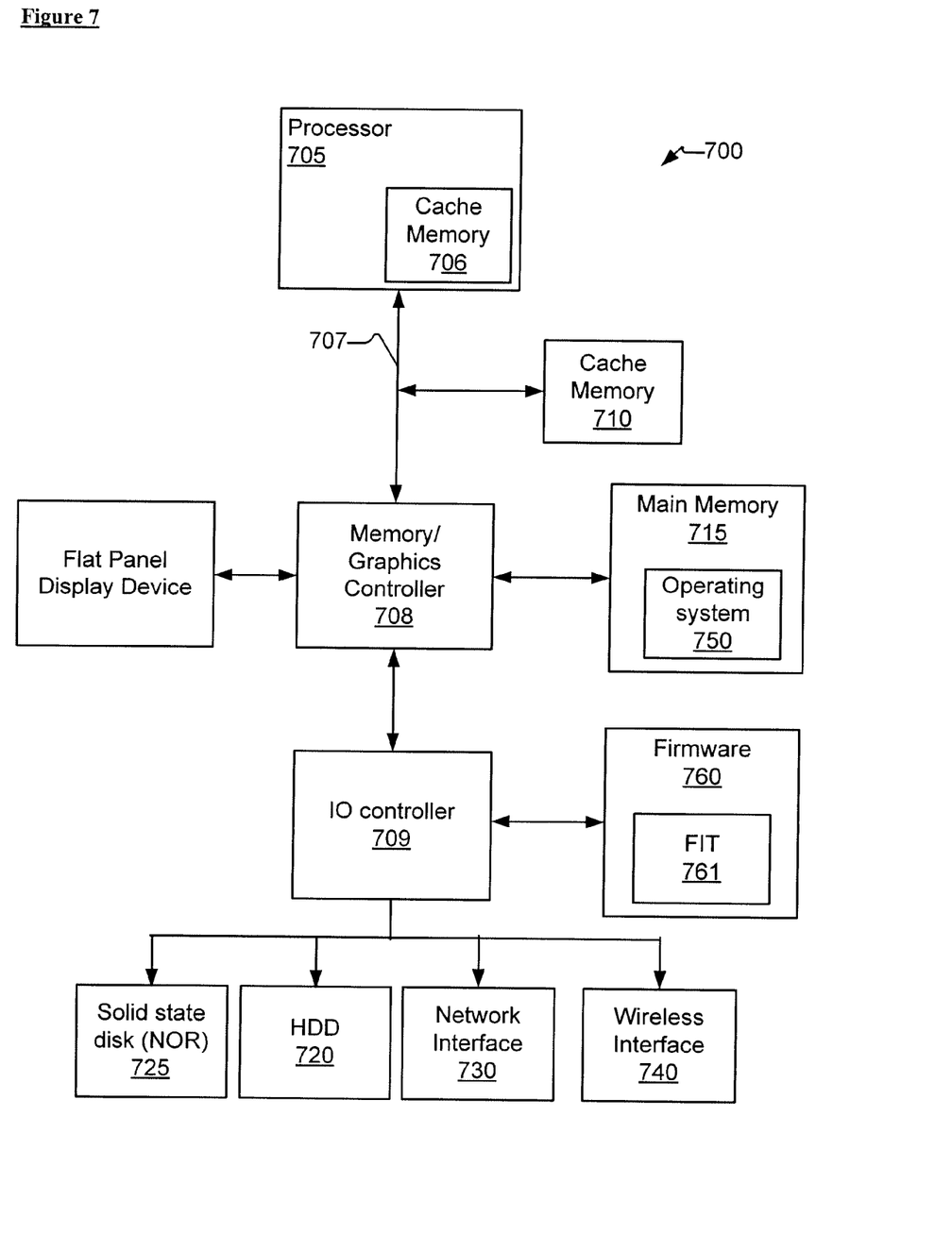
FIG. 7 is a block diagram illustrating a computer system in accordance with one embodiment of the present invention.

FIG. 7 is a block diagram illustrating a computer system in accordance with one embodiment of the invention. In one embodiment, the computer system includes processor 705, memory/graphics controller 708, I/O controller 709, main memory 715, and firmware device 760. In one embodiment, processor 705 accesses data from level 1 (L1) cache memory 706, level 2 (L2) cache memory 710, and main memory 715.

In one embodiment, processor 705 is coupled to memory/graphics controller 708. Memory/graphics controller 708 is coupled to I/O controller 709, which in turn, coupled to firmware device 760, solid state disk 725, hard disk drive 720, network interface 730, and wireless interface 740. In one embodiment, main memory 715 loads operating system 750.

In one embodiment, main memory 715 may be implemented in various memory sources, such as dynamic random-access memory (DRAM), hard disk drive (HDD) 720, solid state disk 725 based on NVRAM technology, or a memory source located remotely from a computer system via network interface 730 or via wireless interface 740 containing various storage devices and technologies. The cache memory may be located either within the processor or in close proximity to the processor, such as on the processor's local bus 707.

In one embodiment, firmware device 760 is a system read only memory (ROM) provided by third party vendors or a non-volatile memory device. In one embodiment, processor 705 is coupled to firmware device 760. In one embodiment, firmware device 760 is located in the same package as processor 705. In other embodiments, firmware device 760 is external to a processor package.

In one embodiment, firmware device 760 contains Basic Input/Output System (BIOS) of the computer system or UEFI firmware modules. The BIOS includes additional segments of code (i.e. routines) that perform system setup during a boot process. In one embodiment, firmware device 760 further includes firmware interface table (FIT 761).

In one embodiment, I/O controller 709 includes one or more I/O host controllers that control one or more I/O interconnects (not shown). In one embodiment, I/O controller 709 is coupled to processor 709 with a single link (i.e., interconnect or bus). In one embodiment, this coupling may be accomplished over a series of links. In one embodiment, processor 705 is coupled over a first link (e.g., local bus 707) to memory/graphics controller 708 (where the memory complex interfaces with a memory subsystem), and memory/graphics controller 708 is coupled to I/O controller 709 over a second link.

In many embodiments, at least one processor 705 is present. In one embodiment, multiple processor cores are present in the system (not shown). In one embodiment, multiple processors, each with single or multi-cores are present in the system (not shown). In embodiments where there are multiple cores and/or multiple processors in the system, a single master core is designated to perform boot and other such system handling processes in the system. Thus, in these embodiments, processor 705 is the master core.

In one embodiment, processor 705 and cache memory 706 are on a same substrate or in a same package. In one embodiment, processor 705, cache memory 706, memory/graphics controller 708, and I/O controller 709 are on a same substrate or in a same package.

Other embodiments of the invention, however, may exist in other circuits, logic units, or devices in conjunction with the system of FIG. 7. Furthermore, other embodiments of the invention may be distributed throughout several circuits, logic units, or devices illustrated in FIG. 7.

Figure 8:
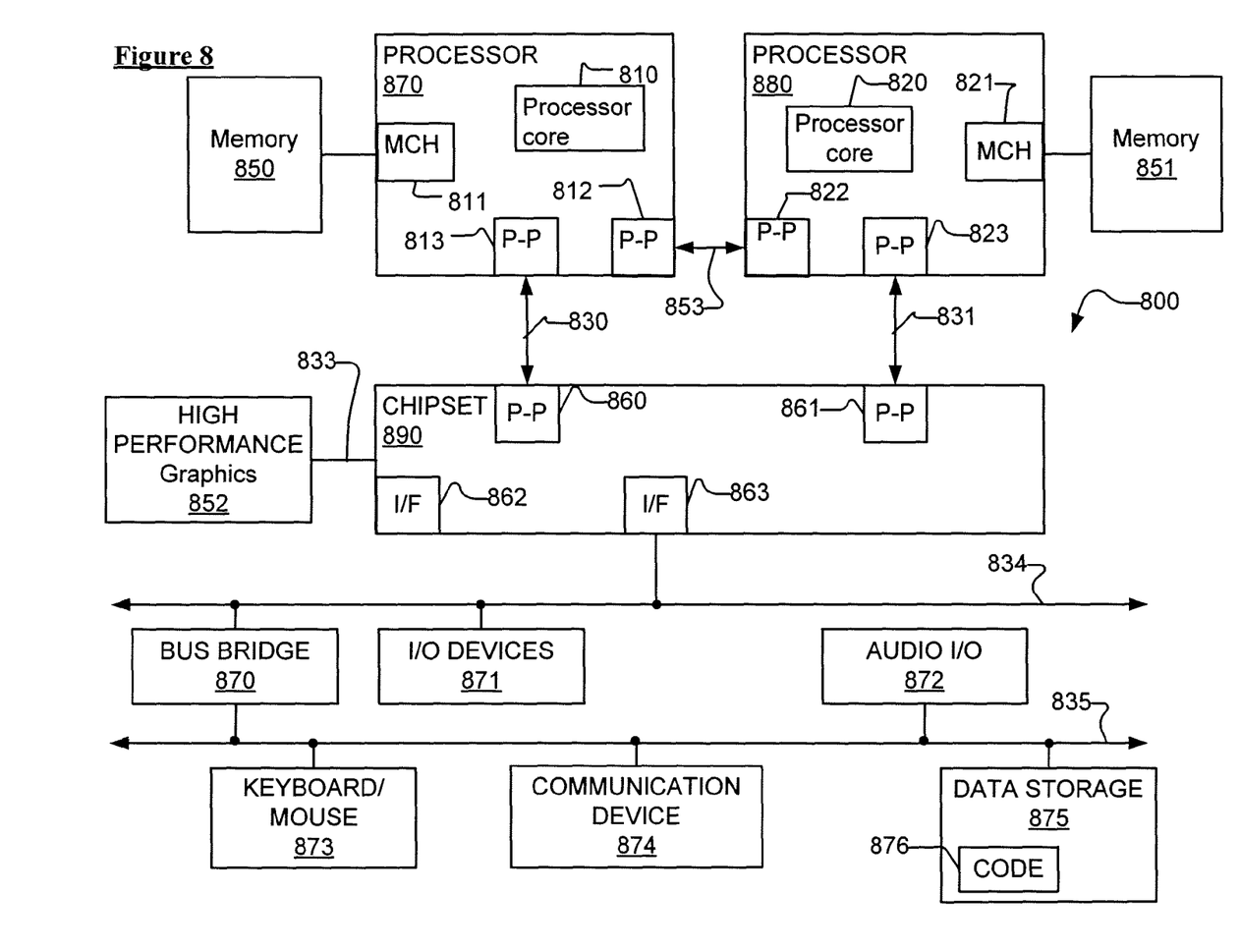
FIG. 8 illustrates a point-to-point computer system in conjunction with one embodiment of the invention.

FIG. 8 illustrates a point-to-point computer system in conjunction with one embodiment of the invention.

FIG. 8, for example, illustrates a computer system that is arranged in a point-to-point (PtP) configuration. In particular, FIG. 8 shows a system where processors, memory, and input/output devices are interconnected by a number of point-to-point interfaces.

The system of FIG. 8 may also include several processors, of which only two, processors 870, 880 are shown for clarity. Processors 870, 880 may each include a local memory controller hub (MCH) 811, 821 to connect with memory 850, 851. Processors 870, 880 may exchange data via a point-to-point (PtP) interface 853 using PtP interface circuits 812, 822. Processors 870, 880 may each exchange data with a chipset 890 via individual PtP interfaces 830, 831 using point to point interface circuits 813, 823, 860, 861. Chipset 890 may also exchange data with a high-performance graphics circuit 852 via a high-performance graphics interface 862. Embodiments of the invention may be coupled to computer bus (834 or 835), or within chipset 890, or coupled to data storage 875, or coupled to memory 850 of FIG. 8.

Other embodiments of the invention, however, may exist in other circuits, logic units, or devices within the system of FIG. 8. Furthermore, in other embodiments of the invention may be distributed throughout several circuits, logic units, or devices illustrated in FIG. 8.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method comprising
starting a boot process from a sleep state;
providing platform services to support an authentication operation as part of the boot process; and
determining whether to complete the boot process based at least on results of the authentication operation, wherein the platform services are executed in one or more memory sections reserved by basic input/output system.

2. The method of claim 1, wherein the sleep state is a S3 power state or an equivalent thereof.

3. The method of claim 1, further comprising causing system to reset if the authentication operation fails.

4. The method of claim 1, further comprising:
determining, based on an indication, whether to provide the platform services; and
terminating the platform services before starting execution from a waking vector.

5. The method of claim 4, wherein the indication is existence of an initial program load (IPL) module during S3 resume boot path.

6. The method of claim 1, wherein providing platform services comprises loading device drivers from one or more firmware volumes.

7. The method of claim 1, further comprising loading a pre-boot authentication module (PBAM), with the support of the platform services, to perform user authentication for disk encryption.

8. The method of claim 1, wherein the platform services support at least a part of driver execution environment (DXE), such that a pre-boot authentication module (PBAM) is executable in conjunction with the DXE and the platform services.

9. An apparatus comprising:
first logic to start a boot process from a sleep state and to provide platform services to support an authentication operation as part of the boot process, wherein the platform services are executed in one or more memory sections reserved by basic input/output system; and
authentication logic to perform the authentication operation to determine whether to complete the boot process based at least on results of the authentication operation.

10. The apparatus of claim 9, wherein the authentication logic is operable to cause a system reset if the authentication operation fails.

11. The apparatus of claim 9, further comprising:
a memory to store one or more firmware volumes;
dispatcher logic to provide the platform services by loading device drivers from the one or more firmware volumes; and
terminator logic to terminate the platform services before starting execution from a waking vector.

12. The apparatus of claim 11, wherein the indication is existence of an initial program load (IPL) module during S3 resume boot path.

13. The apparatus of claim 11, wherein the dispatcher logic is operable to execute a pre-boot authentication module (PBAM), with the support of the platform services, to perform user authentication for disk encryption.

14. The apparatus of claim 9, wherein the first logic and the authentication logic are the same.

15. An article of manufacture comprising a computer readable storage medium including data storing instructions thereon that, when accessed by a machine, cause the machine to perform a method comprising:
starting a boot process from a sleep state;
providing platform services to support an authentication operation as part of the boot process, wherein the platform services are executed in one or more memory sections reserved by basic input/output system; and
determining whether to complete the boot process based at least on results of the authentication operation.

16. The method of claim 15, wherein the sleep state is a S3 power state or an equivalent thereof.

17. The method of claim 15, wherein the method further comprises causing system to reset if the authentication operation fails.

18. The method of claim 15, wherein the method further comprises:
determining, based on an indication, whether to provide the platform services; and
terminating the platform services before starting execution from a waking vector.

* * * * *